(12) United States Patent
Nägele

(10) Patent No.: US 6,838,647 B2
(45) Date of Patent: Jan. 4, 2005

(54) FLEXIBLE HEATING ELEMENT

(75) Inventor: Peter Nägele, Aichach (DE)

(73) Assignee: W.E.T. Automotive Systems AG (DE)

( * ) Notice: Subject to any disclaimer, the term of this patent is extended or adjusted under 35 U.S.C. 154(b) by 0 days.

(21) Appl. No.: 10/155,444

(22) Filed: May 24, 2002

(65) Prior Publication Data

US 2002/0179595 A1 Dec. 5, 2002

(30) Foreign Application Priority Data

May 29, 2001 (DE) .......................................... 101 26 134

(51) Int. Cl.[7] .............................................. H05B 3/34
(52) U.S. Cl. ....................... 219/549; 219/535; 219/209; 219/212; 219/205; 219/528; 219/529; 74/552; 74/557; 29/620; 29/623.2; 29/825
(58) Field of Search ............................... 219/205–207, 219/528, 529, 202, 548, 549, 545, 535, 209, 212; 74/552, 557, 558; 29/620–621, 623.2, 623.4, 825

(56) References Cited

U.S. PATENT DOCUMENTS 3,757,087 A  *  9/1973  Bernard ...................... 219/549
4,061,898 A  *  12/1977  Murray et al. ............... 219/211
4,176,445 A  *  12/1979  Solow .......................... 29/620
4,642,887 A  *  2/1987  Fredriksson ................. 29/611
6,057,530 A  *  5/2000  Gurevich .................... 219/529

* cited by examiner

Primary Examiner—Shawntina Fuqua

(57) ABSTRACT

A surface-heating element for a curved surface and method of producing a heating element is provided. The heating element includes a continuous, planar conductor arranged along a longitudinal axis including a plurality of turns connected by regions being generally transverse to the longitudinal axis. The conductor including end portions each having a terminal for receiving electrical current. The heating element also includes a film applied to one side of the conductor and configured to substantially follow an outer contour of the conductor. The film and the conductor form a continuous web generally centered about the longitudinal axis, and at least one turn connecting two generally transverse regions extends beyond the continuous web. The heating element may also include an adhesive layer on the other side of the heating element sealingly engaging the film.

19 Claims, 3 Drawing Sheets

FLEXIBLE HEATING ELEMENT

TECHNICAL FIELD

The present invention relates to the production of areal heating elements and, in particular, to areal heating elements for heating sharply curved surfaces, such as a steering wheel or a gear shift lever associated with a motor vehicle.

BACKGROUND

Known areal or surface heating elements are difficult to apply to sharply curved or radiused surfaces, such as the steering wheel or gear shift lever of a motor vehicle. Creases in the finished surface are all but unavoidable. Consequently, a control device furnished with a known areal heating element will have an unsightly, corrugated surface, and can provide disagreeable tactile feedback with the operator's hands. Besides the heating conductor, an electrically conductive wire, may be visible on the steering wheel surface and discernable to the operator's hands. Perspiration from the hands can also penetrate the cover of the surface, corrode the wire, and cause the heating system to fail.

Accordingly, there is a need for an improved heating element for application to sharply curved surfaces which overcomes the drawbacks associated with prior surface heating elements.

SUMMARY OF THE INVENTION

The present invention provides a method for producing surface heating elements having smooth surfaces of good aesthetic appearance when implemented resulting in an acceptable feel to the operator's hand. In addition, the areal heating elements of the present invention are durable.

According to the present invention, a process is provided in which the heating conductor, while retaining a stabilizing margin, is formed out of conductive foil in such a way that the conductor remains connected by webs to the marginal region. A synthetic film is applied to one side of the heating conductor and a two-sided adhesive strip is applied to the other side of the heating conductor. Afterwards, the marginal region is removed and the final contour of the heating conductor is cut out, preferably in such manner that a central web remains. This central web allows the heating element to be manipulated around a curved surface without creasing.

A heating element for a curved surface is also provided. The heating element includes a continuous, planar conductor arranged along a longitudinal axis including a plurality of turns connected by regions being generally transverse to the longitudinal axis. The conductor includes end portions each having a terminal for receiving electrical current. The heating element also includes a film applied to one side of the conductor and configured to substantially follow an outer contour of the conductor. The film and the conductor form a continuous web generally centered about the longitudinal axis, and at least one turn connecting two generally transverse regions extends beyond the continuous web. The heating element may also include an adhesive layer on the other side of the heating element sealingly engaging the film.

A method of producing a surface-heating element for a curved surface is also provided. The method includes providing a conductive foil blank and forming a continuous conductor in the blank. The conductor is arranged along a longitudinal axis and includes a plurality of turns connected by regions being generally transverse to the longitudinal axis. At least one of the turns includes a web connecting the conductor to the blank. A film is then applied to one side of the conductor and the blank is cut from the conductor. In the same or a separate step, the film is cut to substantially follow an outer contour of the conductor and maintain a continuous web generally centered about the longitudinal axis. At least one turn connecting two generally transverse regions extends beyond the continuous web. The method can also include applying an adhesive layer to the other side of the conductor prior to, or after cutting the blank from the conductor.

The heating element according to the invention, so produced, includes a heating conductor coated firstly with a plastic film and secondly with a two-sided adhesive tape.

When applied to a surface to be heated, for example a steering wheel, the masking film is removed from the two-sided adhesive tape and the heating element is so mounted on the surface to be heated that the central web comes to lie on the outer surface of the steering wheel. The meandering loops can then be bent and bonded to the inner surface of the steering wheel without creasing.

In an alternate embodiment, instead of adhesive tape, an adhesive may be applied to the heating element immediately before assembly.

Other advantages and features of the invention will become apparent upon reading the following detailed description and appended claims, and upon reference to the accompanying drawings.

BRIEF DESCRIPTION OF THE DRAWINGS

An embodiment of the process according to the invention, and of a heating element according to the invention, will be illustrated with reference to the drawings wherein.

DETAILED DESCRIPTION OF THE INVENTION

While the present invention is described with respect to a heating element and method for making a heating element for application to a steering wheel of a vehicle, the present invention may be adapted and utilized for heating element applications for any curved or contoured surface including: gear shift levers, control knobs, handrails or any contoured surface where heat control and tactile integrity is desired.

In the following description, various operating parameters and components are described for one constructed embodiment. These parameters and components are included as examples and are not meant to be limiting.

Figure 1:
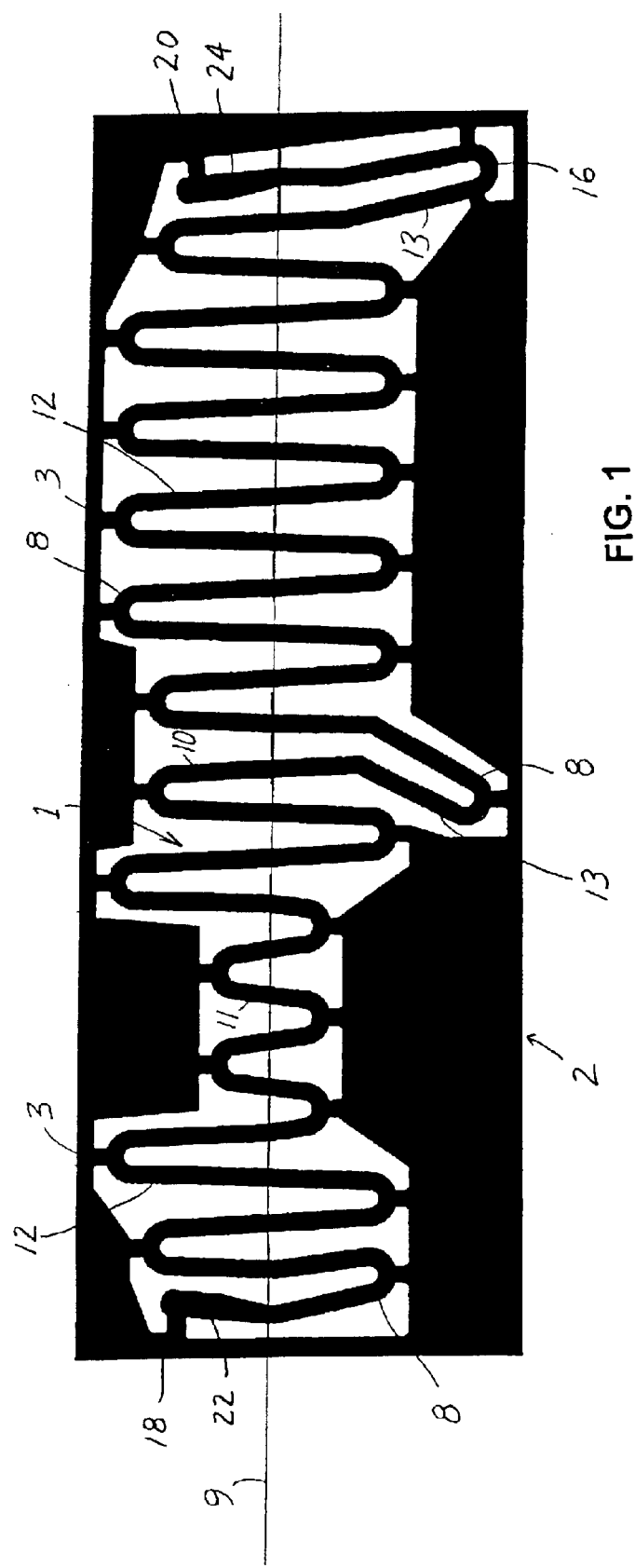
FIG. 1 shows a top view of a blank for a heating element according to a invention.

Referring now to the drawings wherein like reference numerals are used to identify identical components in the various views, FIG. 1 shows a top view of a meandering heating conductor 1 in an intermediate stage of the process according to the present invention. The heating conductor 1 is formed out of a conductive synthetic or metal film, but remains connected to a marginal region 2 by way of a plurality of webs 3.

The heating conductor 1 is a continuous, non-overlapping conductor having a plurality of turns such that the conductor 1 is generally transverse to a longitudinal axis 9. The lengths of the transverse portions 10 of the conductor 1 can vary to include both short transverse portions 11 and long transverse portions 12. Also, some of the transverse portions can include an angled portion 13 with respect to the longitudinal axis 9. The length of each transverse portion 10 generally corresponds to the circumferential distance of the curved surface desired to be heated. Thus, in the case of a steering wheel, for example, the turn-to-turn distance of the heating conductor would generally correspond to the steering wheel circumference and, preferably, be slightly less than the steering wheel circumference to prevent overlap of the heating conductor onto itself or interference resulting in a tacitly discernable ridge or raised portion. If less than the entire circumference of the steering wheel was desired to be heated, the turn-to-turn distance of the heating conductor would correspondingly be less.

The heating conductor 1 is supported on the marginal region or blank 2 by a plurality of webs 3. As shown in FIG. 1, each turn 8 of the heating conductor 1 is attached to the blank 2 by a web 3. Depending upon the thickness and relative rigidity of the heating conductor material, a web 3 may not be necessary at each turn 8. Thus, some turns 8 may not be connected to the blank 2 by a web, while other turns 16 may include more than one web 3. Webs in the form of contacts or terminals 18, 20 are also included proximate each end 22, 24 of the heating conductor 1. The terminals 18, 20 allow current to be applied to the heating conductor 1 by way of supply cables (not shown).

Figure 2:
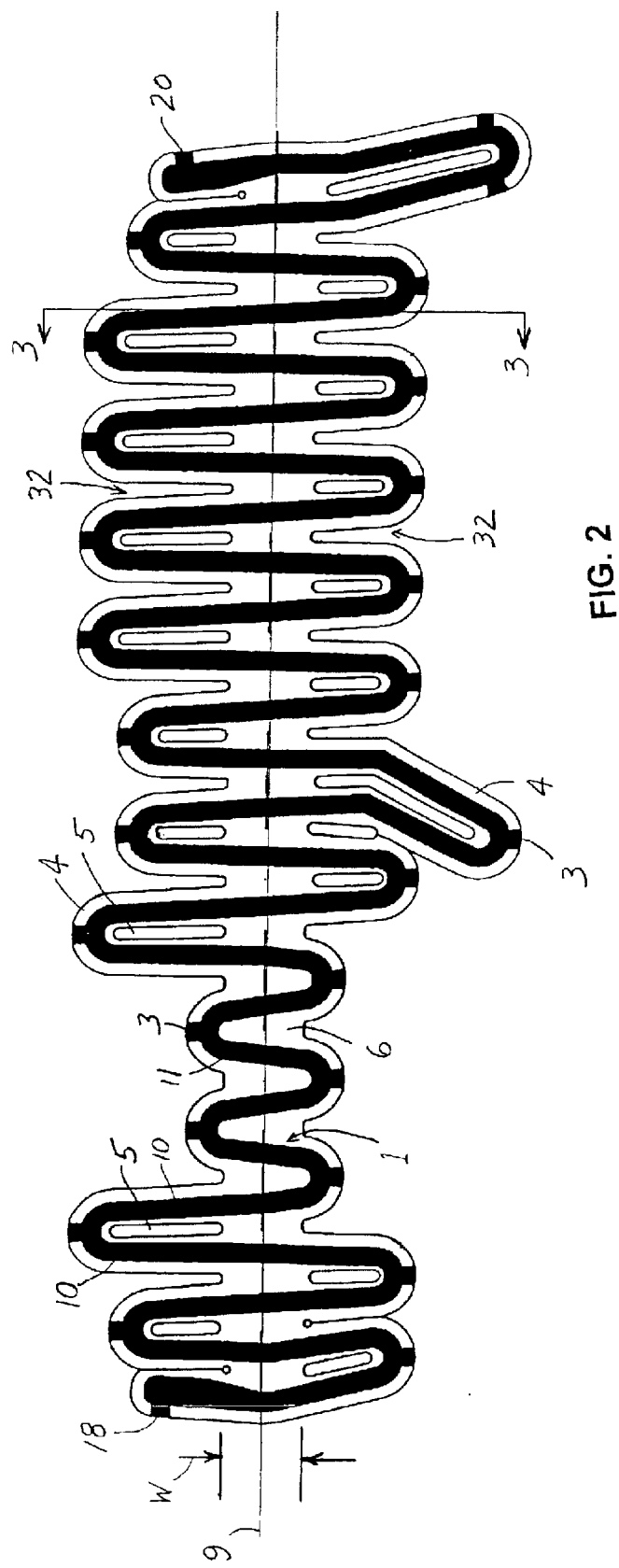
FIG. 2 shows a top view of the heating element of FIG. 1 after trimming of the stabilizing margin.

Referring now to FIG. 2, there is shown a top view of the heating conductor 1 of FIG. 1 after trimming of the blank 2. Prior to trimming, a film 4 such as a synthetic or plastic film is applied to the top surface of the heating conductor 1 and blank 2. The film 4 provides a protective barrier against corrosion or shorting of the heating conductor 1 after application to a curved surface. The film 4 also acts to stabilize and support the heating conductor 1 prior to trimming and after the blank 2 has been trimmed away. A suitable film is a moisture resistant, flexible plastic.

Figure 3:
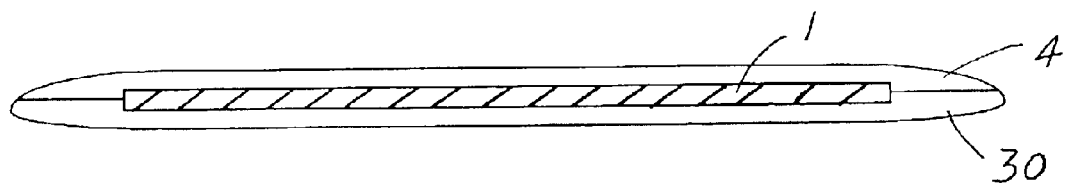
FIG. 3 is a sectional view of the heating element of FIG. 2 taken along line 3—3.

An adhesive layer 30 is also applied to the bottom of the heating conductor. FIG. 3 shows a side sectional view of the heating conductor 1 of FIG. 2 taken along line 3—3. Adhesive layer 30 provides additional support for the heating conductor 1 and eases handling of the blank 2 during fabrication of the heating conductor 1. The adhesive layer 30 can be a two-sided adhesive tape. Alternatively, the adhesive layer can be omitted and an adhesive can be applied to the curved surface and/or bottom of the heating conductor 1 during application of the heating conductor to a surface.

Referring again to FIG. 2, once the film 4 has been applied to the heating conductor 1 and, if desired, adhesive layer 30 has been applied, the heating element is cut out from the blank 2 along the webs 3. Additional material in a region 5 between adjacent transverse portions 10 may also be removed to increase the flexibility of the resulting heating element. A continuous central web 6 remains along the length of the heating element which is substantially centered about the longitudinal axis 9. In the example of FIG. 2, the central web 6 has a width (W) defined by the shortest transverse portions 11. Of course, the width of the central web 6 can be greater or less than that shown. The region S is generally located between the central web 6 and a turn 8.

The resulting heating element 1 is completely surrounded by the film 4 and includes relief areas 32 between transverse portions 10 of the heating conductor opposite each turn 8. Such relief portions 32 permit the heating element to be adhered to a contoured surface such as a steering wheel without creasing or overlapping. The adhesive layer 30 has the same contour as the film 4 when the adhesive layer 30 is applied prior to the final cutting of the heating conductor 1 from the blank 2.

Both the heating conductor 1 and the synthetic film 4, as well as the adhesive layer 30, may be made of thin, very flexible and extensible materials, so that a surface provided with such a heating element will present a smooth, uncreased surface. The thickness of the heating element assembly is on the order of tenths of a millimeter.

In operation, an electrical supply can be connected between any two remaining webs 3, but preferably is connected between terminals 18, 20 to activate the heating element along its entire length. Once current is applied, the heating element will warm the surface it covers uniformly and be protected from shorting or corrosion by the film 4.

The process according to the invention makes possible an economical production especially because the synthetic film and the two-sided adhesive tape cohere in a 'strip,' which is simple and convenient to mount on a curved surface such as a steering wheel. The heating element is only some tenths of a millimeter in thickness, and the heating conductor 1 is hardly felt if at all through the covering of the steering wheel or curved surface.

From the foregoing, it can be seen that there has been brought to the art a new and improved heating element which has advantages over previous surface heating elements. While the invention has been described in connection with one or more embodiments, it should be understood that the invention is not limited to these embodiments. Accordingly, the invention covers all alternatives, modifications and equivalents as may be included within the spirit and scope of the appended claims.

What is claimed is:

1. A surface-heating element for a curved surface comprising:

a continuous, planar conductor arranged along a longitudinal axis including a plurality of turns connected by regions being generally transverse to the longitudinal axis, the conductor including end portions each having a terminal for receiving electrical current; and a film applied to one side of said conductor and configured to substantially follow a contour of said conductor, said film and conductor forming a continuous web generally centered about said longitudinal axis, and wherein at least one turn connecting two generally transverse regions extends beyond said continuous web.

2. A surface heating element according to claim 1 wherein a plurality of turns, each connecting two generally transverse regions, extend beyond said continuous web and wherein, between adjacent turns extending beyond said continuous web, relief portions are formed in said film.

3. A surface-heating element according to claim 1 comprising an adhesive layer applied to another side of said planar conductor, said adhesive layer and said film sealingly engaging each other about said conductor.

4. A surface-heating element according to claim 3 wherein said adhesive layer comprises two-sided adhesive tape.

5. A surface-heating element according to claim 1 wherein said film is moisture resistant.

6. A surface-heating element according to claim 1 wherein, between at least one turn and said continuous web, an opening is formed in said film.

7. A surface-heating element according to claim 1 wherein at least one generally transverse region is formed at an angle with respect to said longitudinal axis.

8. A surface heating element according to claim 1 wherein a majority of said turns include a web for supporting said conductor on a blank during fabrication.

9. A surface-heating element for a curved surface comprising;
- a continuous, planar conductor arranged along a longitudinal axis including a plurality of turns connected by regions being generally transverse to the longitudinal axis, the conductor including end portions each having a terminal for receiving electrical current;
- a moisture-resistant film sealing one side of said conductor and configured to substantially follow an outer contour of said conductor; and
- an adhesive layer applied to another side of said conductor, said adhesive layer and said film sealingly engaging each other about said conductor, said film, conductor and adhesive layer forming a continuous web generally centered about said longitudinal axis, and wherein at least one turn connecting two generally transverse regions extends beyond said continuous web.

10. A surface heating element according to claim 9 wherein a plurality of turns, each connecting two generally transverse regions, extend beyond said continuous web and wherein, between adjacent turns extending beyond said continuous web, relief portions are formed in said film and said adhesive layer.

11. A surface-heating element according to claim 9 wherein, between at least one turn and said continuous web, an opening is formed in said film and said adhesive layer.

12. A surface-heating element for a curved surface comprising:
- a continuous, planar conductor arranged along a longitudinal axis including a plurality of turns connected by regions being generally transverse to the longitudinal axis, the conductor including end portions each having a terminal for receiving electrical current;
- a moisture-resistant film sealing one side of said conductor and configured to substantially follow an outer contour of said conductor; and
- an adhesive layer applied to another side of said conductor, said adhesive layer and said film sealingly engaging each other about said conductor, said film, conductor and adhesive layer forming a continuous web generally centered about said longitudinal axis, and wherein at least one turn connecting two generally transverse regions extends beyond said continuous web, and
- wherein said transverse regions vary in length and said continuous web is approximately equal in width to a shortest transverse region.

13. A method of producing a surface-heating element for a curved surface comprising;
- providing a conductive foil blank;
- forming a continuous conductor in said blank, said conductor being arranged along a longitudinal axis and including a plurality of turns connected by regions being generally transverse to the longitudinal axis, at least one of said turns including a web connecting said conductor to said blank;
- applying a film to one side of said conductor;
- cutting said blank from said conductor; and
- cutting said film to substantially follow an outer contour of said conductor and maintain a continuous web generally centered about said longitudinal axis, and wherein at least one turn connecting two generally transverse regions extends beyond said continuous web.

14. A method according to claim 13 comprising forming an opening in said film between at least one turn and said continuous web.

15. A method according to claim 13 wherein at least one of said generally transverse regions is arranged at an angle with respect to said longitudinal axis.

16. A method of producing a surface-heating element for a curved surface comprising:
- providing a conductive foil blank;
- forming a continuous conductor in said blank, said conductor being arranged along a longitudinal axis and including a plurality of turns connected by regions being generally transverse to the longitudinal axis, at least one of said turns including a web connecting said conductor to said blank;
- applying a film to one side of said conductor;
- applying an adhesive layer to another side of said conductor and contacting said film to sealingly engage said film about said conductor;
- cutting said blank from said conductor; and
- cutting said film and adhesive layer to substantially follow an outer contour of said conductor and maintain a continuous web generally centered about said longitudinal axis, and wherein at least one turn connecting two generally transverse regions extends beyond said continuous web.

17. A method according to claim 16 comprising forming an opening in said film and adhesive layer between at least one turn and said continuous web.

18. A method according to claim 16 wherein forming a continuous conductor includes maintaining a web connecting each turn to said blank and forming a terminal at each end of said conductor.

19. A method according to claim 16 wherein at least one of said generally transverse regions is arranged at an angle with respect to said longitudinal axis.

* * * * *